Figures 1, 2, 3:
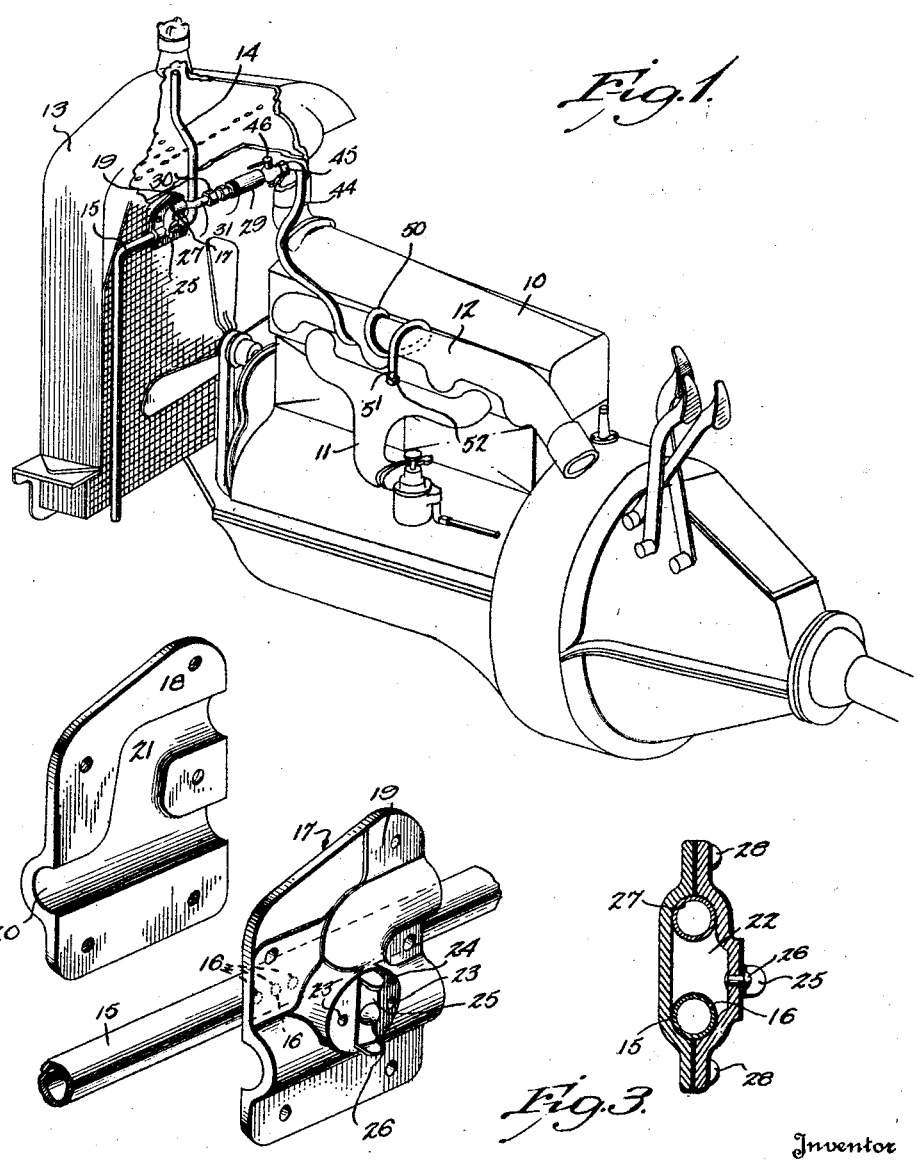

March 23, 1926. 1,578,216
J. STUTIKA
ATTACHMENT FOR INTERNAL COMBUSTION ENGINES
Filed August 11, 1924 2 Sheets-Sheet 1

Inventor
JOHN STUTIKA
By
Attorney

March 23, 1926. 1,578,216
J. STUTIKA
ATTACHMENT FOR INTERNAL COMBUSTION ENGINES
Filed August 11, 1924    2 Sheets-Sheet 2
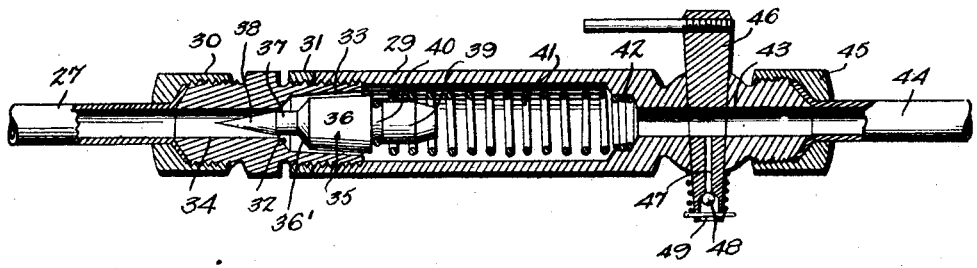
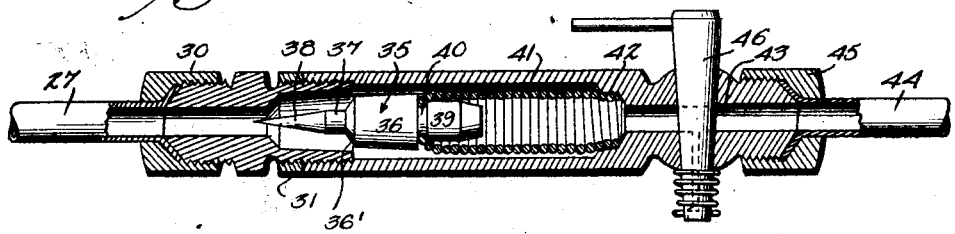
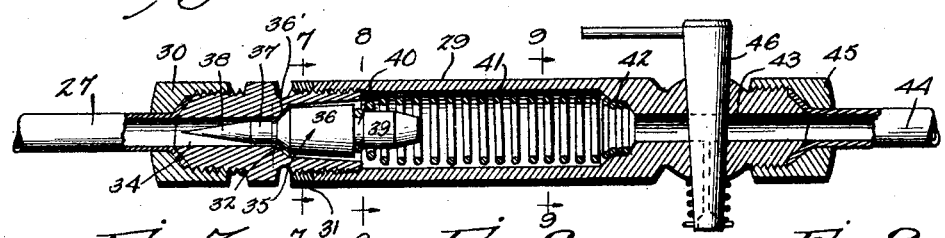
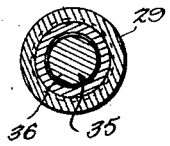 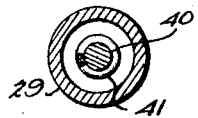 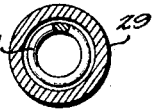
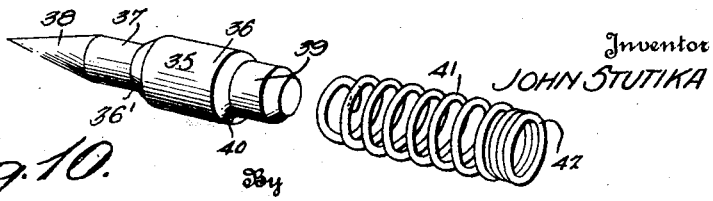
Inventor
JOHN STUTIKA Patented Mar. 23, 1926.

1,578,216

UNITED STATES PATENT OFFICE.

JOHN STUTIKA, OF WEST PULLMAN, ILLINOIS.

ATTACHMENT FOR INTERNAL-COMBUSTION ENGINES.

Application filed August 11, 1924. Serial No. 731,513.

*To all whom it may concern:*

Be it known that I, JOHN STUTIKA, a citizen of the United States, residing at West Pullman, in the county of Cook and State of Illinois, have invented certain new and useful Improvements in Attachments for Internal-Combustion Engines, of which the following is a specification.

This invention relates to attachments for internal combustion engines and more particularly to a device adapted for supplying heated moisture and air to the intake manifold of an engine to increase the efficiency of the explosive mixture and prevent the formation of carbon within the cylinders.

Heretofore it has been proposed to supply additional air and moisture to the intake manifold of an engine in gradually increasing quantities as the speed of the engine increases. I have found that when running at low speeds, the spring of the air valve of the carburetor is usually too stiff to permit the drawing in of a sufficient quantity of air to produce an efficient explosive mixture. However, when the speed of the engine is increased somewhat, corresponding generally to a vehicle speed of about twenty to twenty-five miles per hour, a more efficient mixture is provided due to the proper operation of the carburetor air valve spring. At higher speeds, however, up to a certain point, the supply of air again becomes insufficient due to the high vacuum created by rapid piston movement.

It is an important object of the present invention to provide a novel type of valve which is automatic in its action and is adapted to supply moisture and air to the intake manifold at low engine speeds, the valve opening remaining constant during those engine speeds in which the carburetor air valve provides sufficient air to the combustible mixture and, again increasing the proportions of air and vapor at higher speeds, a further automatic action being provided for stopping the supply of moisture and air at excessively high speeds.

A further object of the invention is the provision of novel means for suppyling heated air and moisture to the valve mechanism above mentioned.

Other objects and advantages of the invention will become apparent during the course of the following description.

In the drawings, I have shown one embodiment of the invention. In this showing,

Figure 1 is a perspective view of an automobile engine and associated elements, the invention being shown in place, Figure 2 is a detail perspective view of the air and moisture admission means, Figure 3 is a detail sectional view taken transversely of the device shown in Figure 2, Figure 4 is a central longitudinal sectional view through the automatic valve shown in a position corresponding to moderate engine speeds, Figure 5 is a similar view showing the device in a position corresponding to excessively high speeds, Figure 6 is a similar view showing the device in a position corresponding to the very low engine speeds, Figure 7 is a detail sectional view on line 7—7 of Figure 6, Figure 8 is a similar view on line 8—8 of Figure 6, Figure 9 is a similar view on line 9—9 of Figure 6, and, Figure 10 is a detail perspective of the automatic valve and its associated spring.

Referring to the drawings, the numeral 10 designates an automobile engine shown in the present instance as the engine of a Ford automobile. The engine is provided with the usual intake manifold 11 and exhaust manifold 12. The usual radiator 13 is mounted forwardly of the engine as shown in Figure 1.

As shown in Figure 1, an overflow pipe 14 is provided, having its upper end arranged near the upper end of the radiator and its lower end arranged near the lower end of the radiator to discharge excessive water in the usual manner. Intermediate the ends of the overflow pipe 14, I provide a horizontal portion 15 having a series of openings 16 arranged therein. The numeral 17 designates as a whole a moisture and air supply member comprising complementary sections 18 and 19 as clearly shown in Figure 2. Each of the sections 18 and 19 is provided with a complementary semi-circular cut-out portion 20 adapted to be clamped about the horizontal portion 15 of the overflow pipe. The members 18 and 19 are further provided with complementary by-passes 21 communicating with a space 22 formed in the member 19 and communicating with the interior of the overflow pipe through the openings 16 as shown in Figure 3. The member 19 is provided with air openings 23 extending through a flattened portion of circular shape formed on the exterior of the member 19. An air adjusting member 25 is pivotally connected as at 26 centrally of the flattened portion 24. It will be obvious that rotation of the member 25 will vary the amount of air drawn into the space 22 through the openings 23. A pipe 27 has one end arranged within the cut-out portion 21 as shown in Figure 3. Screws or other fastening elements 28 are adapted to clamp the complementary sections 18 and 19 against opposite sides of the pipes 14 and 27 as shown in Figure 3. The numeral 29 designates the casing of an automatic valve connected with the pipe 27 through a union 30 of the usual type as shown in Figure 4. The inner end of the union is externally threaded for reception within the internally threaded end of the casing 29 and a jam nut 31 is arranged on the end of the union 30 and adapted to engage the end of the casing 29. The union 30 is provided with a conical valve seat 32 as shown in Figure 4 and communication between the interior of the casing 29 and the valve seat 30 is provided through a slightly tapered passage 33. A cylindrical bore 34 affords communication between the valve seat 32 and the interior of the pipe 27, as clearly shown.

The numeral 35 designates as a whole an automatic valve having a slightly tapered body portion 36. As shown in Figures 4 to 6 inclusive, the taper of the body portion 36 of the valve corresponds to that of the opening 33. The valve is provided intermediate its ends with a second tapered portion 36' adapted to act as a valve normally seating against the valve seat 32. The valve 35, outwardly of the portion 36' is provided with a cylindrical portion 37 and the valve terminates at its outer end in a pointed portion 38. The inner end of the valve is provided with a cylindrical portion 39 which joins the body portion by means of a reduced neck 40. A compression spring 41 is arranged within the valve casing and one end of this spring is reduced in size to firmly engage the neck 40, as shown. The opposite end of the spring 41 is also somewhat reduced and adapted to tightly frictionally engage the reduced portion 44 of the valve casing bore. The inner end of the valve casing is provided with a cylindrical longitudinal opening 43 which communicates with a pipe 44 secured to the valve casing by means of a standard union 45. A manually controlled valve 46 is arranged in a transverse opening in the valve casing and is adapted to control passage of air and moisture through the opening 43. The valve 46 is provided with a drain opening 47 extending through the lower end of the valve and a ball 48 is adapted to control the openings, as shown in Figure 3. A pin 49 arranged in the lower end of the valve 46 retains the ball 48 within the lower end of the valve.

As shown in Figure 1, the pipe 44 has a portion 50 coiled about the exhaust pipe 12 of the engine and the lower end 51 of the pipe is tapped into the intake manifold and securely maintained in position by a lock member 52.

The operation of the device is as follows:

It will be noted that the air and moisture supply member 17 is arranged adjacent the rear face of the radiator intermediate the ends and sides thereof. As air is drawn through the pipe 27 it is heated by the radiator before it passes into the space 22 through the openings 15. Similarly, heated water vapors will be drawn into the space 22 from the upper end of the pipe 14. The heating of the air before it mingles with the water vapor within the space 22 prevents the vapor from condensing, as will be obvious. The proportions of air and water vapors supplied to the valve 36 may be varied by changing the position of the member 25 as previously described.

When the engine of the vehicle is not running, it will be obvious that the valve face 36' is engaged with the seat 32, but as soon as the engine is started the valve face 36' will be unseated and air and water vapors will flow through the casing 29 and pipe 44 to the intake manifold. Obviously the air and vapor will be superheated by passing through the coil 50 surrounding the exhaust pipe of the engine. When the engine is idling or running at slow speeds, the valve 35 will be in the position shown in Figure 6, admitting a slight quantity of air and water vapor. For slow speeds the space between the valve face 36' and seat 32 will be approximately equal to the space between the cylindrical portion 37 and the bore 34. The space between the valve face 36' and seat 32 increases materially when the engine is running at a moderate speed during which the air valve of the carburetor supplies practically sufficient air for efficient combustion. Since the portion 37 of the valve is cylindrical, it will be apparent that at this time no increased amounts of air and water vapor will be supplied to the engine. For speeds of twenty to twenty-five miles per hour, the automatic valve will be substantially in the position shown in Figure 4 but when the speed of the vehicle increases the outer end of the cylindrical portion will pass beyond the outer end of the valve seat 32 and an increased amount of air and water vapor will be supplied to the engine as is desirable. I have found that for excessively high speeds it is not necessary to supply air and water vapor to the engine through the valve casing 29 and accordingly, I have arranged the spring 41 so that the successive turns thereof will close tightly against each other, as shown in Figure 5, to prevent additional air and moisture from flowing into the pipe 44.

It will be obvious that I have provided an automatic valve which is adapted to supply additional air and water vapors in the quantities desired for varying engine speeds which will provide the greatest fuel efficiency possible. The operation of the valve is such as to materially increase the mileage obtained from the fuel and formation of carbon within the cylinders is prevented. The valve 46 may be controlled manually to govern the quantities of air and water vapor supplied to the engine as it is found desirable by experience.

It is to be understood that the forms of my invention herewith shown and described are to be taken as preferred examples of the same, and that various changes in the shape, size and arrangement of parts may be resorted to without departing from the spirit of my invention or the scope of the subjoined claims.

I claim:

1. A device of the character described, comprising a valve casing communicating at its outlet end with the intake manifold of an engine, the opposite end of said casing being open and provided with a substantially cylindrical bore and a slightly tapered bore spaced therefrom and increasing in diameter inwardly, a valve seat connecting said bores, a valve arranged in said casing, said valve having a valve face adapted to engage said seat and a substantially cylindrical portion arranged within and slightly spaced from said cylindrical bore and being further provided with a portion tapered to correspond with and slightly spaced from said tapered bore, and a coil spring normally seating said valve face.

2. A device of the character described comprising a valve casing communicating at its outlet end with the intake manifold of an engine, the opposite end of said casing being open and provided with a substantially cylindrical bore and a slightly tapered bore spaced therefrom and increasing in diameter inwardly, a valve seat connecting said bores, a valve arranged in said casing, said valve having a valve face adapted to engage said seat and a substantially cylindrical portion arranged within and slightly spaced from said cylindrical bore and being further provided with a portion tapered to correspond with and slightly spaced from said tapered bore, and a coil spring snugly surrounding the inner end of said valve, said casing communicating with the intake manifold of the engine through the coils of said spring, said valve being adapted to open under the influence of the vacuum of the intake manifold and to move inwardly a sufficient distance to fully compress said spring at excessively high engine speeds.

3. A device of the character described comprising a valve casing communicating at its outlet end with the intake manifold of an engine, the inlet end of said casing being open and provided with a relatively small substantially cylindrical bore, said casing being provided inwardly of and spaced from said cylindrical bore with a relatively large bore, a valve seat connecting the bores of the casing, a valve arranged in said casing and provided with a valve face adapted to engage said seat, said valve being further provided with a substantially cylindrical portion normally arranged within and slightly spaced from said cylindrical bore, and a coil spring normally seating said valve.

4. A device constructed in accordance with claim 3 wherein said valve is provided outwardly of said cylindrical portion with a portion tapered to decrease in diameter toward its end.

In testimony whereof I affix my signature.

JOHN STUTIKA.